United States Patent

Gifford et al.

[11] Patent Number: 5,841,876
[45] Date of Patent: Nov. 24, 1998

[54] HYBRID ANALOG/DIGITAL VIBRATION CONTROL SYSTEM

[75] Inventors: Carl S. Gifford, Gilbert, Ariz.; Owen Jones, Alreford Colchester; Michael Charles John Trinder, East Bereholt, both of England

[73] Assignee: Noise Cancellation Technologies, Inc., Linthicum, Md.

[21] Appl. No.: 749,718

[22] Filed: Nov. 15, 1996

Related U.S. Application Data

[63] Continuation of Ser. No. 380,789, Jan. 30, 1995, Pat. No. 5,469,018, which is a continuation of Ser. No. 45,486, Apr. 7, 1993.

[51] Int. Cl.[6] .................................................. A61F 11/06
[52] U.S. Cl. ............................................... 381/71.14
[58] Field of Search ........................... 381/71.14, 71.13, 381/71.11, 71.9, 71.8, 71.1, 71.2

[56] References Cited

U.S. PATENT DOCUMENTS 4,423,289 12/1983 Swinbanks ........................... 381/71.14
4,739,513 4/1988 Kunugi et al. ............................. 381/96
5,105,377 4/1992 Ziegler et al. ........................ 381/71.11

OTHER PUBLICATIONS

"Recursive Algorithms for Active Noise Control", L. J. Ericksson International Symposium on Active Control of Sound and Vibration, pp. 137–146, April 9–11, Tokyo, Japan.

*Primary Examiner*—Curtis A. Kuntz
*Assistant Examiner*—Ping W Lee
*Attorney, Agent, or Firm*—Renee Michelle Larson

[57] ABSTRACT

A vibration control system includes a processor-based circuit which monitors and controls an analog vibration control circuit. The system include, a sensor to detect the undesirable vibrations and a synchronous pulse generator for determining the fundamental frequency of the vibrations emitted by the source. An actuator produces anti-noise to counter unwanted vibrations. The processor circuit tests the system, monitors system functions, and adjusts various parameters to provide optimal performance.

26 Claims, 12 Drawing Sheets

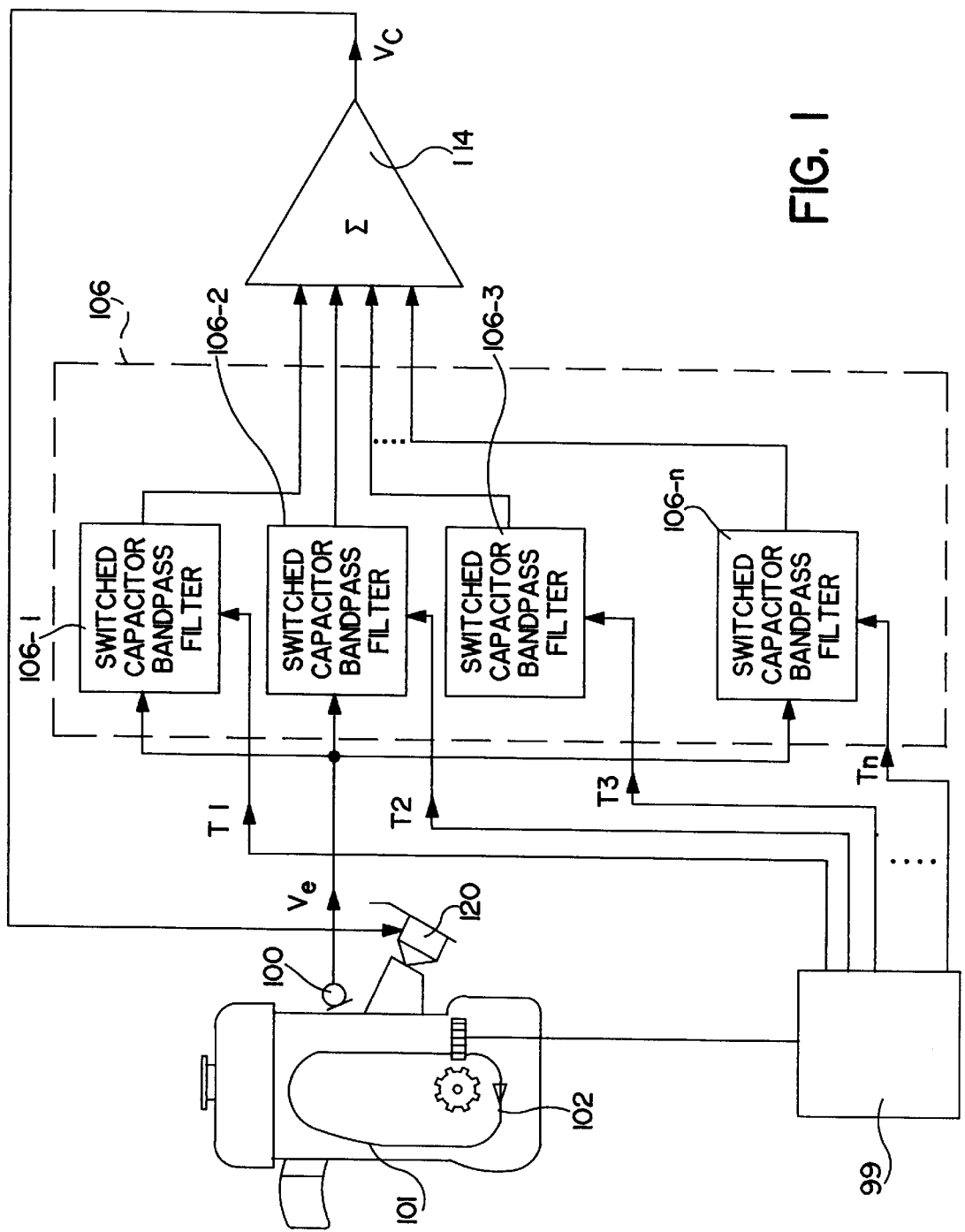

HYBRID ANALOG/DIGITAL VIBRATION CONTROL SYSTEM

CROSS-REFERENCES TO RELATED APPLICATIONS

This application is a continuation of U.S. Ser. No. 08/380,789, filed Jan. 30, 1995, now U.S. Pat. No. 5,469,018, which is a continuation of U.S. Ser. No. 08/045,486, filed Apr. 7, 1993.

This application is a continuation-in-part of PCT Patent Application No. PCT/GB92/01399, entitled *Noise Reduction System*, filed originally in the United Kingdom on Jul. 30, 1991, assigned U.K. Patent Application No. 9116433.5, by Owen Jones and Michael Charles John Trinder, two of the present inventors.

BACKGROUND OF THE INVENTION

1. Field of the Invention

The invention relates to active systems for isolating and canceling noise and vibrations generated by machinery.

2. Description of the Related Art

Most rotating or reciprocating machines generate vibrations. The vibrations are often transmitted to the structure supporting the machine and into the surrounding air. Structural vibrations may damage nearby machinery or the structure itself. Vibrations transmitted into the air, on the other hand, are perceived as soundwaves. Depending on the source and the environment, the sound from the machine may be uncomfortable to those in the area, or even dangerous.

In the past, unwanted noise and vibration has been controlled by muffling or isolation. However, using the principle of superposition, noise and vibration can also be controlled by production of an acoustic signal having the same spectral characteristics as the unwanted noise or vibration but 180 degrees out of phase (anti-noise). Several aspects of anti-noise and its applications are discussed in an article by Professor Barrie Chaplin, entitled "Anti-Noise—The Essex Breakthrough," published in *CME Magazine*, January 1983, pages 41–47.

U.S. Pat. No. 4,527,282, issued to Chaplin et al. on Jul. 2, 1985, discloses a system for canceling an unwanted acoustic signal. A speaker generates a canceling acoustic signal, which is mixed with an unwanted acoustic signal. A microphone senses the residual acoustic signal, which is then amplified and inverted to drive the speaker. Systems of this type are typically prone to instabilities and tend to be effective only in a relatively restricted range of frequencies.

A system which avoids the instability problems of simple systems, such as that disclosed in U.S. Pat. No. 4,527,282, is described in U.S. Pat. No. 4,490,841 issued to Chaplin et al. on Dec. 25, 1984. In the described system, the residual signal is analyzed by means of a Fourier transformer. The resultant Fourier coefficients are then processed to produce a set of Fourier coefficients used to generate a canceling signal.

Systems which process signals in the frequency domain, e.g. using Fourier transformation, perform their function well under steady-state conditions. However, if the fundamental frequency of the noise signal changes, the system requires several cycles to re-establish effective cancellation. This is due to the time taken to perform the Fourier transformation. If such apparatus is used in an internal combustion engine noise control system, bursts of noise will occur during acceleration and deceleration. These bursts may, in fact, have a higher peak value than the unsuppressed steady-state engine noise. Furthermore, the need to carry out high-speed digital signal processing makes these systems expensive.

SUMMARY OF THE INVENTION

In accordance with one aspect of the invention, a vibration control system comprises: a vibration sensor for generating an electrical signal corresponding to the vibrations; second sensor for detecting the periodic frequency of the vibration and generating a corresponding signal; at least one adjustable center frequency bandpass filter, connected to the vibration sensor and receptive of vibration signals, for isolating and transmitting a component of the vibration signal at a frequency related to the periodic frequency of the noise to generate a control signal; and an actuator, responsive to control signals, for generating counter-vibrations.

According to one aspect of the present invention, a vibration control system also includes a processor-based digital circuit which interfaces with an analog circuit, e.g. adjustable center frequency filter, where the digital circuit controls the analog circuit. The digital circuit may be used to vary the quality and/or center frequencies of the filter, monitor and adjust the operation of the circuit to eliminate clipping, and provide optimal performance, and to test the overall circuit.

BRIEF DESCRIPTION OF THE DRAWING

The preferred exemplary embodiment of the present invention will hereinafter be described in conjunction with the appended drawing, wherein like designations denote like elements, and:

FIG. 1 is a block diagram of an engine vibration control system embodying a basic form of the present invention;

DETAILED DESCRIPTION OF THE PREFERRED EMBODIMENT

Figure 2A:
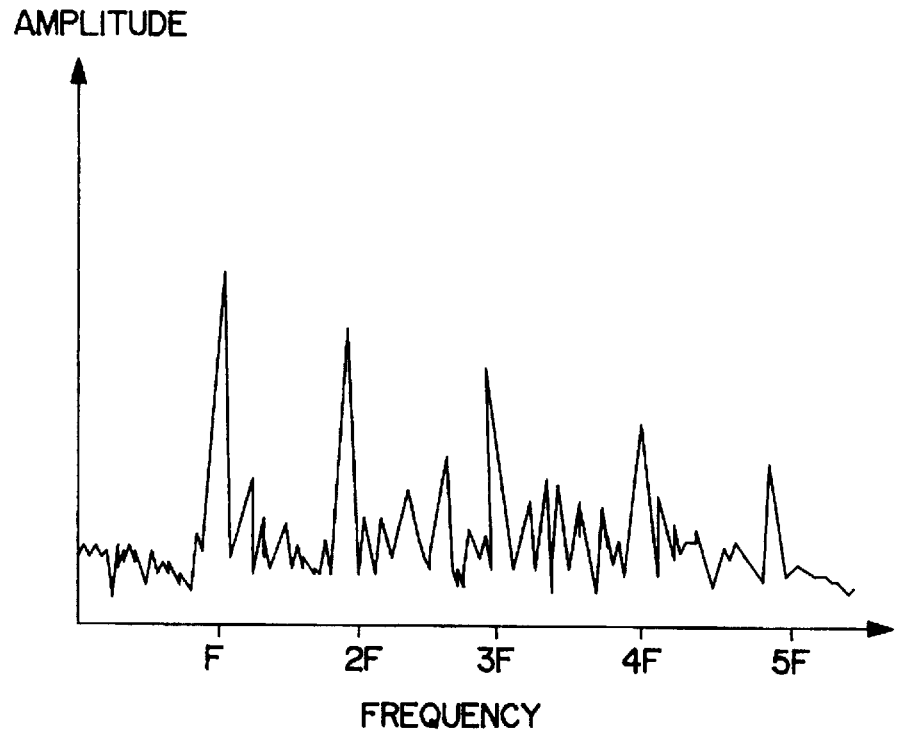
FIG. 2A is an idealized representation of the vibration signal from an internal combustion engine.

Referring to FIG. 1, a vibration control system embodying a basic form of the present invention, adapted to control vibrations generated by an internal combustion engine 101 employed in, for example, a road vehicle, comprises: a sensor for generating a signal indicative of the vibrations to be controlled, e.g. an accelerometer 100; a selective filter 106 for isolating engine-generated vibrations from random vibrations; a conventional engine speed sensor of the type typically employed in electronic engine management systems, such as a toothed wheel rotation sensor 102; a summing amplifier 114; an actuator 120, suitably an electromagnetic actuator, for generating counter-vibrations to cancel unwanted vibrations, e.g., an actuator 120 suitably integrated into a mount for engine 101; and a suitable controller 99, receptive of signals from sensor 102, and generating control signals to filter 106.

Accelerometer 100 is positioned on the vehicle body near actuator 120 to sense the vibrations transmitted by engine 101. Filter 106, preferably comprising a bank of adjustable center frequency narrowband bandpass filters 106-1 to 106-n, is connected to receive the output from accelerometer 100. These filters may be any type of filter having adjustable center frequencies, such as, for example switched-capacitor filters, and suitably have center frequencies based on a reference frequency. These filters also suitably have adjustable quality factors. Filters 106-1 to 106-n are tuned to a series of related frequencies, e.g. integer or non-integer multiples of a fundamental frequency generated by engine 101. For example, in the case of harmonically related frequencies, if filter 106-1 is tuned to F, then filter 106-2 is tuned to 2F and so on up to filter 106-n which is tuned to nF. The outputs from filters 106-1 to 106-n are coupled to respective inputs of summing amplifier 114. Actuator 120 is coupled to be driven by the output from the summing amplifier 114. Controller 99 receives a train of pulses indicative of engine speed from sensor 102.

Operation of the internal combustion engine 101 produces vibrations comprising a number of components, typically related harmonically to the engine rotation frequency. For instance, a four-cylinder four-stroke engine running at 3000 rpm will produce a spark for each half cycle, i.e. 6000 per minute. The engine 101 rotates one full cycle for every two revolutions of the crankshaft. This equates to vibrations with a fundamental component at 25 Hz, and rich in harmonic components. The balance that is inherent in most engines, however, means that the second order component of the engine rotation frequency, i.e. 100 Hz, and multiples thereof, are of the most significant amplitude. On the other hand, the engine 101 may be somewhat imbalanced, which may cause significant intermediate components to arise. Engine 101 will also produce some broadband vibrations but these are typically at a much lower level.

It should be noted that acoustic energy is commonly generated by the mechanical vibration of an object. Conversely, acoustic energy incident upon a body tends to impart a vibration to the body. In a sense, vibrations may be viewed as acoustic energy propagating through a medium other than air, and sound waves may be similarly characterized as vibrations of the air itself. Because the methods and apparatus discussed in this disclosure generally apply to sound waves and mechanical vibrations, the terms are generally applied interchangeably herein. Thus, the principles described in this disclosure may be applied to cancel acoustic noise as well as mechanical vibrations.

Considering the system shown in FIG. 1 with actuator 120 disconnected from summing amplifier 114, vibrations generated by the engine 101 are sensed by accelerometer 100 which outputs an electrical signal Ve, representing the sensed vibrations. The signal Ve is then fed to the filters 106-1 to 106-n.

Filters 106-1 to 106-n are electrically tuned in accordance with signals T1 to Tn, produced by controller 99, so that each filter 106-1 to 106-n is tuned to a different frequency component of the vibrations. Controller 99 receives a pulse signal from rotation sensor 102 related to the rotation speed of the engine. The signals T1 to Tn are produced by controller 99 in response to the rate of the pulse signal from the rotation sensor 102 so that the filters 106-1 to 106-n are caused to track changes in the rotation frequency of the engine.

Figure 2B:
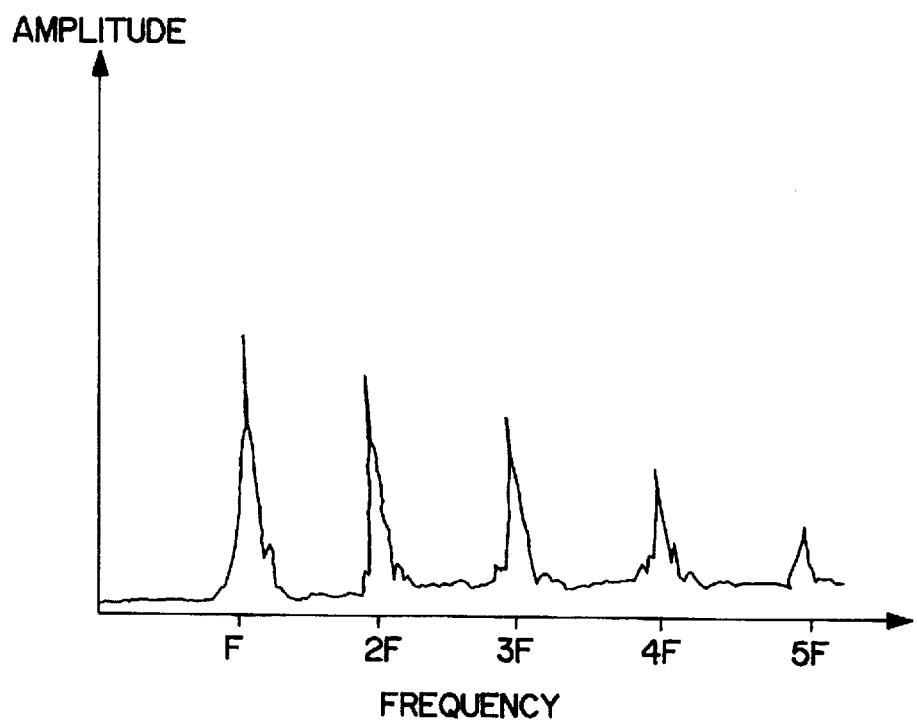
FIG. 2B is an idealized representation of the vibration signal after filtering in the absence of a canceling signal.

It can be seen from a comparison of FIGS. 2A and 2B that those parts of the vibration spectrum having the highest amplitudes, in this example the harmonics of the engine rotation frequency F, are passed substantially unchanged, while the remaining, low-level elements are greatly attenuated. Using this technique of parallel bandpass filters, it is possible to extend the effective bandwidth of the system without encountering stability problems. The use of bandpass filters means that the maximum phase shift occurring in the filter bank is +90 or −90 degrees, making it easier to ensure that the Nyquist Stability Criterion is met by the system.

The outputs from the filters 106-1 to 106-n are fed to summing amplifier 114 which outputs an actuator control signal Vc. The signal Vc may undergo equalization or further amplification (not shown) depending on the requirements of actuator 120 employed.

The system shown in FIG. 1 will now be considered with actuator 120 reconnected; the loop is designed such that the acoustic signals from actuator 120 reaching accelerometer 100 are nominally 180 degrees out of phase with the relevant engine vibration. Signal Ve output from accelerometer 100 is now representative of the instantaneous difference between the engine vibration and the acoustic signals from actuator 120, that is the error between the desired zero vibration condition and the total vibration produced by the system.

Figure 3:
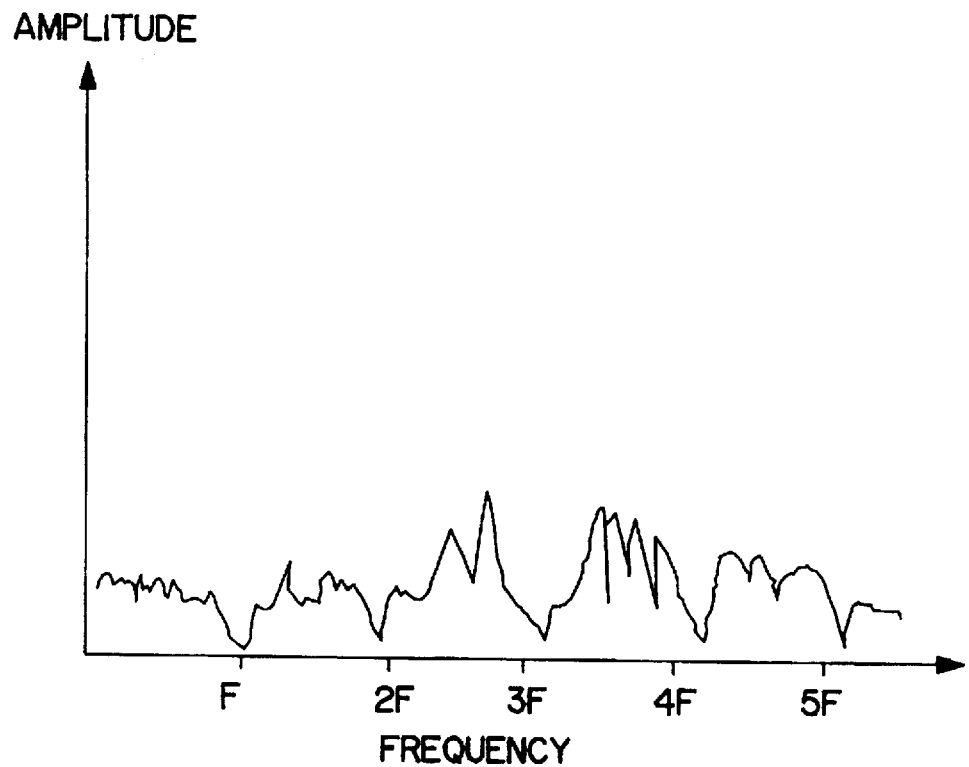
FIG. 3 is an idealized representation of the vibration signal combined with a canceling signal.

Signal Ve is then filtered and fed to summing amplifier 114 to produce the signal Vc as in the open loop situation described above. However, since the loop is now closed the vibration components related to the engine rotation frequency will be attenuated. The other vibration components will remain substantially unchanged as no relevant anti-noise is being produced because most of the components of the signal Vc, representing these vibration components, are blocked by filters 106-1 to 106-n. The resulting total vibration occurring in the vehicle body when the system is in operation is shown in FIG. 3.

Since the system does not need to carry out a Fourier analysis of the engine noise, it can more closely track changes in engine speed, thereby reducing the bursts of noise during acceleration and deceleration. Filters 106-1 to 106-n are, preferably, of the switched-capacitor type, and may thus be tuned by varying the switching rate. The switching rate in the embodiment shown in FIG. 1 is controlled by the signals T1 to Tn which are pulse trains frequency locked to the engine rotation frequency and relevant related frequencies.

Figure 4:
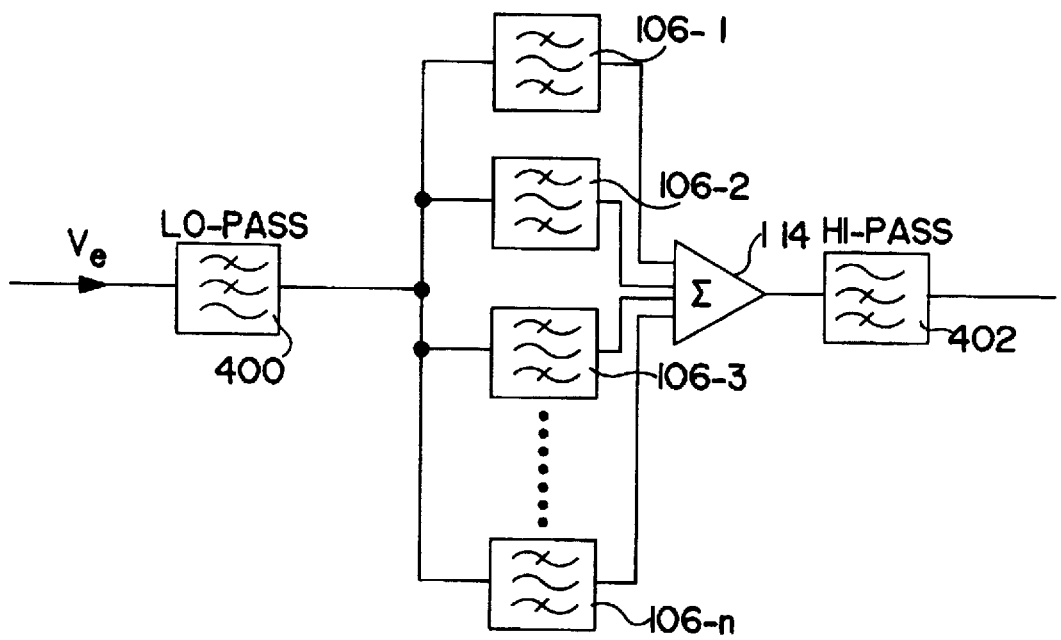
FIG. 4 shows a first arrangement of anti-aliasing and compensation filters.
Figure 5:
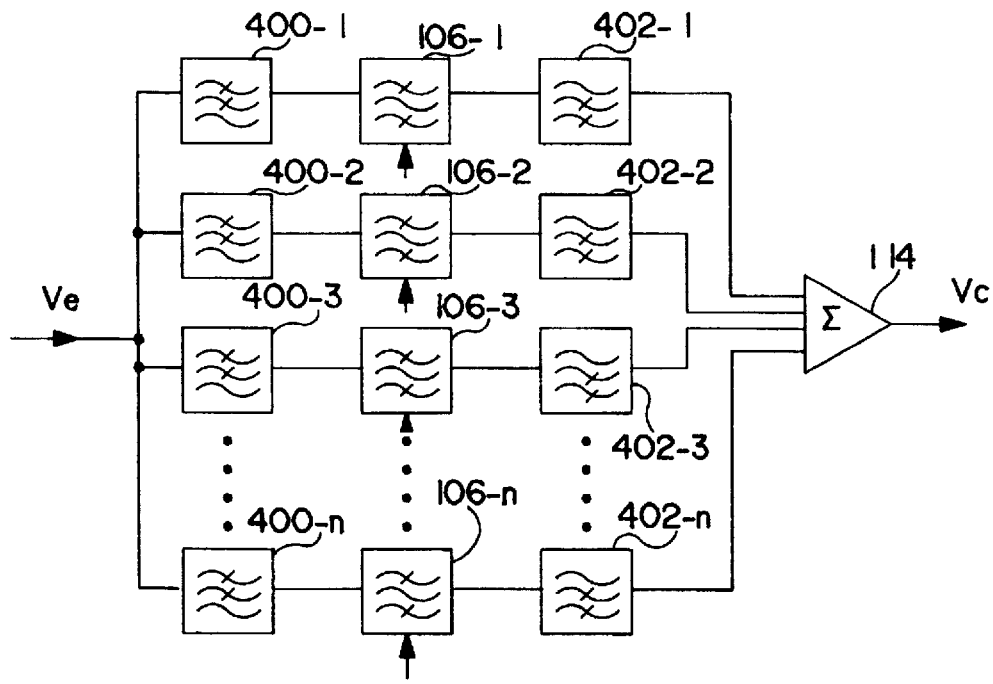
FIG. 5 shows a second arrangement of anti-aliasing and compensation filters.

When using filters 106-1 to 106-n which have a sampling function, such as switched-capacitor filters, it may be desirable to employ an anti-aliasing filter. The inclusion of an anti-aliasing filter introduces unwanted additional phase shifts into the loop. However, a compensating filter may be used after filters 106-1 to 106-n restore the original phase relationships. Two possible arrangements of anti-aliasing and compensating filters are shown in FIGS. 4 and 5. Referring to FIG. 4, an anti-aliasing filter 400 is inserted before the signal line divides to go to each of switched-capacitor filters 106-1 to 106-n. A single compensating filter 402 is then inserted after summing amplifier 114. In the arrangement shown in FIG. 5, an anti-aliasing filter 400-1 to 400-n and a compensating filter 402-1 to 402-n are provided around each switched capacitor filter 106-1 to 106-n.

Figure 6:
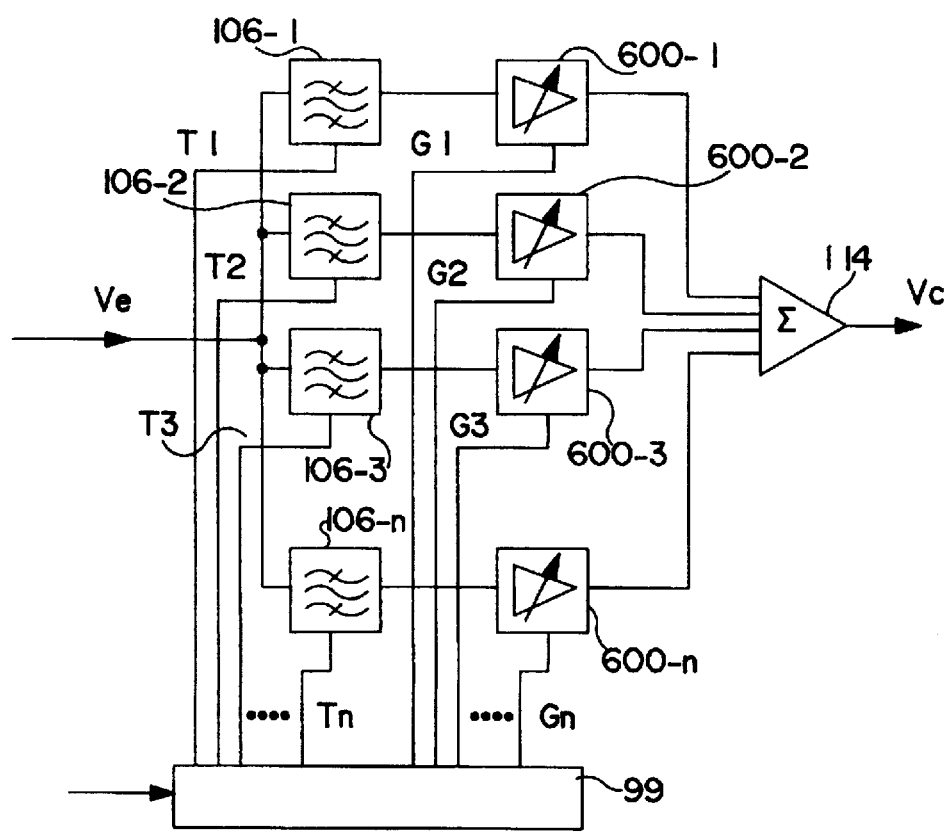
FIG. 6 shows an arrangement for varying the gain of the narrowband bandpass filter.

To ensure the stability of the system as the engine rotation frequency increases, it may be desirable to reduce the gain of bandpass filter 106. An arrangement which achieves this is shown in FIG. 6. A voltage controlled amplifier 600-1 to 600-n is placed in series, following each of filters 106-1 to 106-n. Each amplifier 600-1 to 600-n is controlled by a respective signal Gl to Gn generated by controller 99. Controller 99 in this case further includes a frequency-to-voltage converter which is arranged to output a dc signal proportional to the periodic frequency of the noise source that the filters are tracking. This dc signal is then used to generate the amplifier control signals G1 to Gn. By adjusting the gain of each filter as the frequency rises, stability may be maintained.

Figure 7:
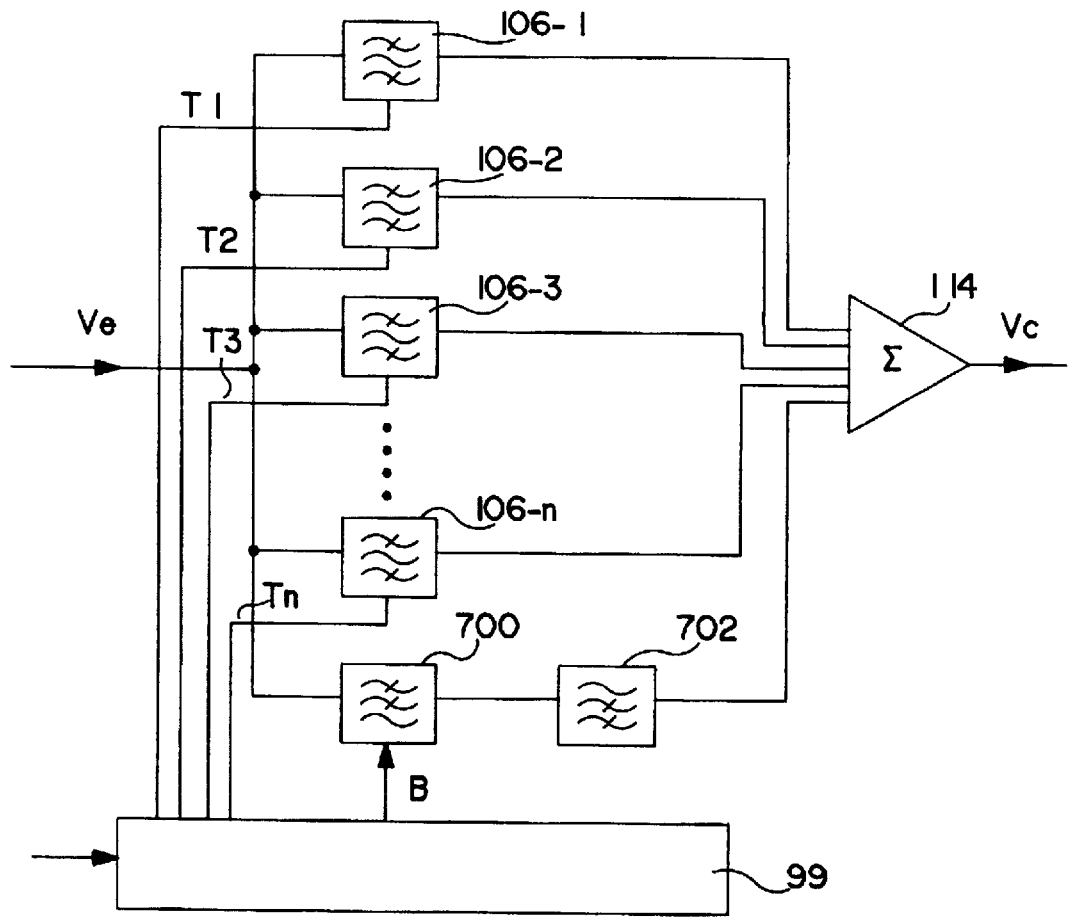
FIG. 7 shows a filter arrangement including a broadband filter.

While the system described above is effective at dealing with periodic acoustic signals, it provides only limited cancellation of random acoustic signals. The random acoustic signal performance of the system may be improved by using a broadband bandpass filter in parallel with switched-capacitor filters 106-1 to 106-n. In the arrangement shown in FIG. 7, the broadband bandpass filter comprises a high-pass filter 702 in series with a low-pass filter 700. Both filters 700 and 702 preferably are of the switched-capacitor type. The –3 dB frequency of the high-pass filter 702 is suitably fixed. However, the –3 dB frequency of the low-pass filter 700 is preferably variable under the control of controller 99. Controller 99 outputs a signal B which gradually reduces the –3 dB frequency of the low-pass filter 700 when the highest filtered frequency rises past a predetermined threshold. This reduction of the low-pass filter –3 dB frequency improves the high frequency stability of the system. If desired, the –3 dB frequency of the high-pass filter 702 may also be varied as a function of engine rotation frequency by a similar technique.

In a further embodiment of the system, the clock frequency may be fixed and the control parameters of the CPU adjusted such that the filter 106 and the equalizer 916 form a generalized multi-pole/zero compensator. The filter coefficients may then be set so that the system operates as a broadband random vibration virtual earth controller. The filter coefficients may still be set upon analysis of the electromechanical transfer function, under control of the CPU in such a way as to optimize the cancellation performance from application to application.

Filter 106 (FIG. 1) can be implemented by any filter circuit which may be adjusted to isolate relevant frequencies. For example, filters 106-1 to 106-n are suitably implemented using commercially available switched capacitor active filter integrated circuits such as the MF 10 switched-capacitor filter, or MAX 260 microprocessor programmable universal active filter marketed by MAXIM Integrated Products. Using these circuits it is possible to form filters having extremely high Q values. However, high Q filters formed using an MF 10-type device are prone to the build-up of dc offset voltages. These may be suppressed by means of a dc servo loop around either each of filters 106-1 to 106-n or by an averaging dc servo loop around the bank of filters 106-1 to 106-n.

Figure 8:
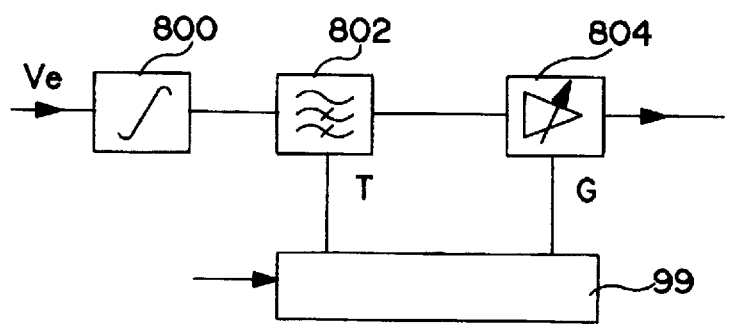
FIG. 8 shows alternative narrowband bandpass filter.
Figure 7A:
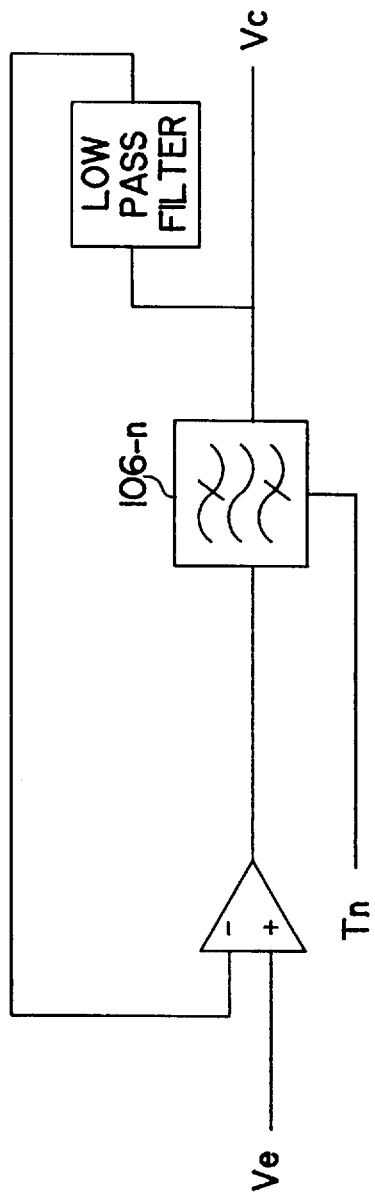
Figure 9:
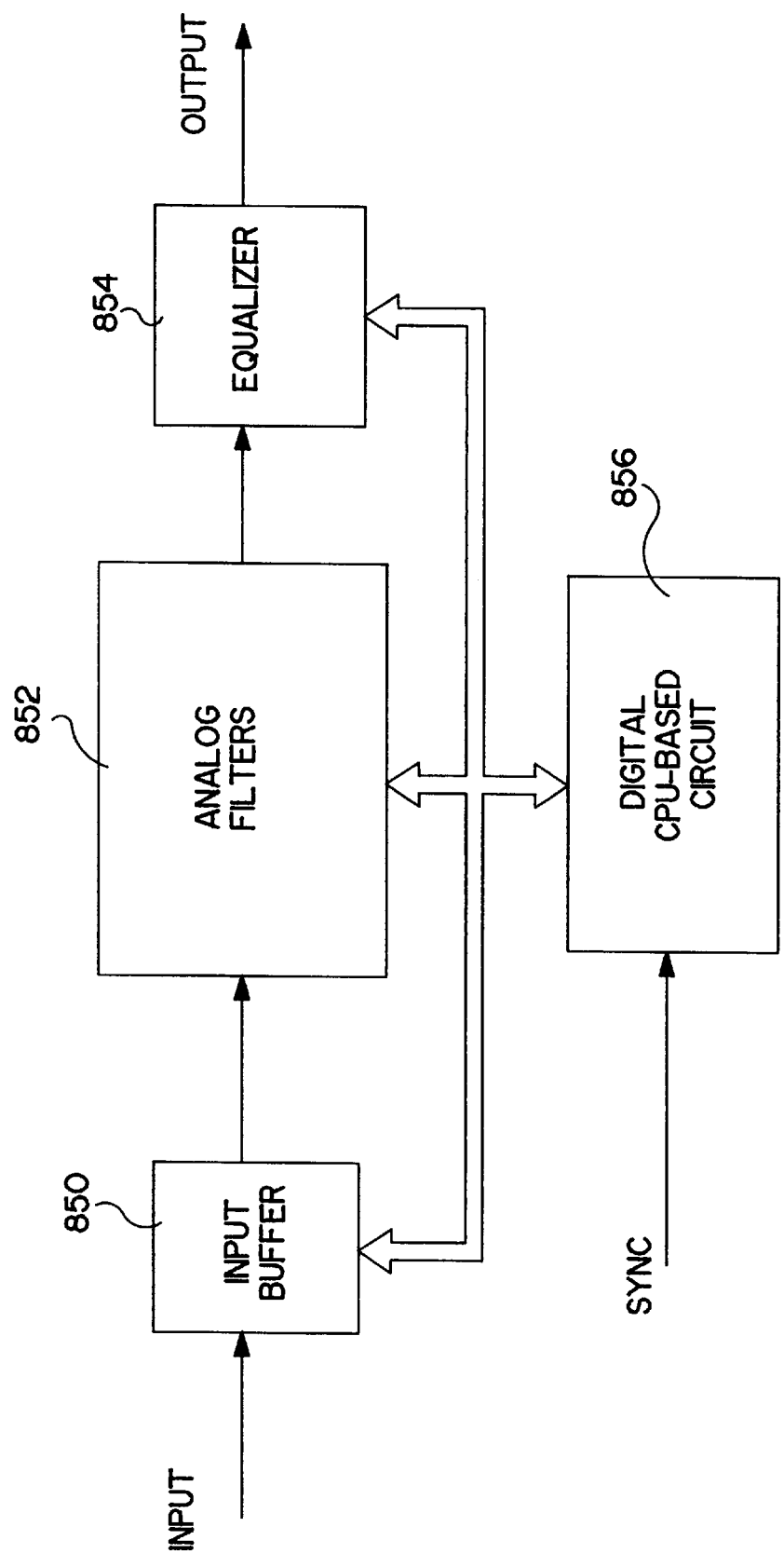
FIG. 9 is a generalized block diagram of a vibration control system according to the present invention.

Alternatively, as illustrated in FIG. 8, respective series combinations of an integrator 800 and a second order high-pass filter 802 may be employed as filters 106-1 to 106-n; in the system shown in FIG. 1, each of 106-1 to 106-n would be replaced by the combination of an integrator 800 and a high-pass filter 802. High-pass filter 802 may be implemented using switched-capacitor techniques, in which case its –3 dB frequency would be varied under the control of controller 99 in order to tune the combination. However, as periodic frequencies of the noise (e.g., the engine rotation frequency) increases, the gain of the bandpass filter as a whole will fall. A voltage controlled amplifier 804, also under the control of controller 99, can be used to compensate for the loss in gain. Controller 99 outputs to amplifier 804 a signal G, dependent on the engine rotation frequency, to increase the gain of amplifier 804 with increases in engine rotation frequency.

Figure 10:
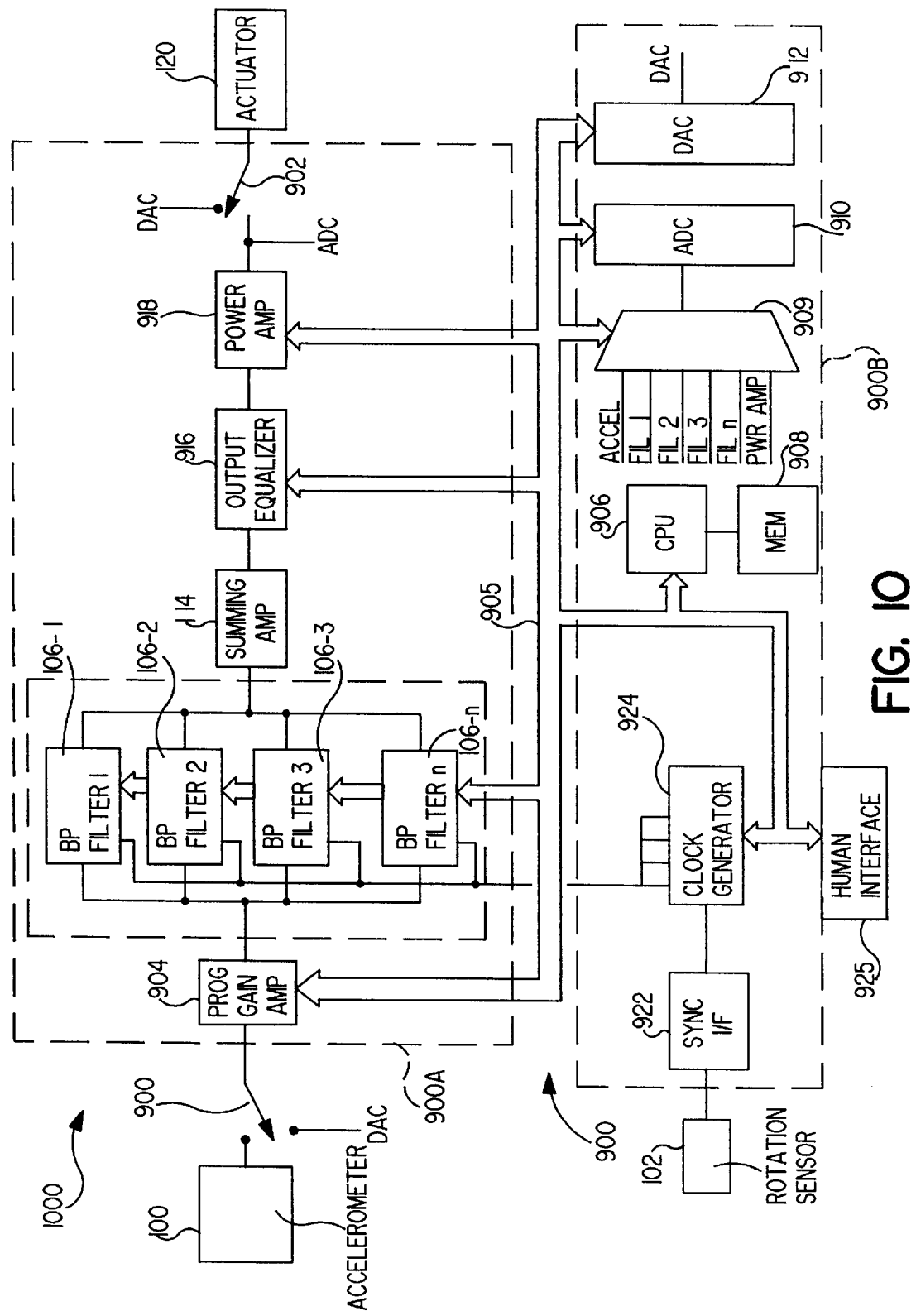
FIG. 10 is a circuit diagram of an embodiment of a vibration control circuit. according to the present invention incorporating a CPU.

Referring now to FIG. 10, a generalized block diagram of the control circuitry according to the preferred embodiment is illustrated. The control circuitry generally comprises an input buffer 850, programmable analog filters 852, an equalizing circuit 854, and a digital CPU-based circuit 856. Input buffer 850 is generally an interface buffer for receiving data from sensor 100 and conditioning the signals for processing by analog filters 852. Suitably, input buffer 850 may be an amplifier having programmable gain to provide the proper amplitude of signals from sensor 100. Input buffer 850 suitably performs amplification, which may be variable by the CPU, and, if desired, filtering. Simple filtering may be desirable in order to eliminate various specific problem frequencies, such as electromagnetic interference generated by nearby electrical systems. In addition, variable gain of the amplification provides for stability of the system and at the same time maximizing cancellation performance of the vibration control system.

Analog filters 852 generally include analog filters tuned to relevant frequencies. For broadband cancellation, some of the analog filters may be tuned to specific relevant frequencies that remain constant. Analog filters 852 further include tracking filters, like those described above, which are controlled by a synchronizing signal, such as the synchronizing signal generated by rotation sensor 102. Analog filters 852 amplify relevant frequencies and attenuate non-relevant frequencies to isolate the signals at the relevant frequencies to allow cancellation.

Equalizer 854 assists in maintaining a stable system in view of the transfer characteristics of the mechanical and electrical systems. The electromechanical system formed by engine 101, the engine mount, and the vibration control system exhibits a frequency response that may be characterized by a transfer function, which is used to program equalizer 854. Equalizer 854 limits variances of the phase shift over the operating range of the vibration control system in view of the transfer function. Essentially, equalizer 854 attempts to maintain constant phase shift for all signals transmitted between sensor 100 and actuator 120. In the preferred embodiment, equalizer 854 amplifies signals at certain frequencies and attenuates signals at others. The particular frequencies to be amplified and attenuated may be programmed according to the transfer function, thus improving system stability.

Digital CPU-based system 856 interacts with input buffer 850, analog filters 852, and equalizer 854 to provide a measure of intelligence and robustness to the vibration control system permitting: adjustment of the system transfer function to be moved according to the current needs of the vibration control system; the relevant frequencies (whether or not related to the synchronizing frequency) to be changed and adjusted continuously while the system is operating; the vibration control system to test itself; and monitoring and adjusting system parameters to provide optimal performance and maintain system stability over the entire frequency range of interest.

Referring to FIG. 10, a digitally controlled system 1000 for controlling engine vibration in accordance with the present invention comprises: a hybrid analog circuit 900 including a programmable analog portion 900A (generally corresponding to filter 106 and summing amplifier 114 of FIG. 1), and a digital control portion 900B (generally corresponding to controller 99 of FIG. 1) ; accelerometer 100; rotation sensor 102; and actuator 120. Analog circuitry 900A suitably comprises circuitry for controllably performing time domain processing and shaping of the sensed engine vibration signal and providing the drive signal to actuator 120, in accordance with control signals from digital control circuit 900B. Analog circuit 900A effectively operates as a type of virtual ground (virtual earth) feedback system. Feedback in the illustrated system is provided by actuator 120 and sensor 100; the output of sensor 100 reflects the effects of the operation of actuator 120. Digital control circuit 900B develops control signals for the various components of analog circuit 900A on a dynamic basis, suitably in accordance with a characteristic frequency of the noise or vibration source, here the engine rotation frequency as indicated by sensor 102. As will be explained, digital circuit 900B can also provide for self-diagnostics.

As shown in FIG. 10, analog circuit 900A suitably includes a conventional programmable gain amplifier 904; a suitable programmable active filter 106, preferably parallel bandpass filters 106-1 to 106-n, implemented employing a MAX 260 microprocessor programmable universal active filter; a summing amplifier 114; a suitable programmable output equalizer 916; and a programmable gain power amplifier 918. Signals generated by accelerometer 100 are provided, suitably through a switch 900 as will be explained, to programmable gain amplifier 904. The gain of amplifier 904 is dynamically adjusted, in accordance with signals from controller 900B, to provide sufficient amplification of the sensor signal without clipping caused by over amplification. The amplified signals received from accelerometer 100 are provided in parallel to bandpass filters 106-1 to 106-n. Filter 106 isolates vibrations generated by the engine from random vibrations originating from the engine 101 or other sources, and transmits them to the summing amplifier 114. Engine 101 generates vibrations primarily at frequencies related to the engine rotation frequency, like integer or non-integer multiples of a fundamental frequency. Each filter 106-1 to 106-n has a programmable center frequency, and a programmable Q, and programmable gain. As described above, the center frequency for each filter is programmed so that one filter transmits signals in a band centered at an appropriate frequency related to the engine rotation frequency, and remaining filters transmit signals in bands centered at various related frequencies, e.g., integer or non-integer multiples of the engine rotation frequency. The output of each individual bandpass filter is connected to summing amplifier 114, which sums the signals generated by filters 106-1 to 106-n.

If desired, one or more tunable bandpass filters may be included which are not responsive to the synchronizing signal, but are instead responsive to an independent frequency signal generated by control circuit 900B, as will be explained. Such filters would permit cancellation of signals that are unrelated to engine speed, like various pumps or motors within the system that typically operate at a constant speed (or operate at a variable speed appropriately sensed independent of engine rotation).

In the preferred embodiment, the output of summing amplifier 114 is connected to programmable output equalizer 916, such as, for example National Semiconductor LMC835, which programmably amplifies or attenuates signals according to the particular frequency of each signal. Output equalizer 916 performs stabilizing functions by compensating for the electromechanical characteristics of the engine mount system and sensor 100. Because the engine mount is an electromechanical system, it exhibits a unique frequency response having amplitude and phase characteristics. These characteristics are expressed by a transfer function which remains relatively constant for each engine mount, though it may change slightly over time. The transfer function with respect to a particular frequency may be determined by applying a signal of that particular frequency through actuator 120 to the engine mount. The response of the engine mount is then determined by the output of sensor 100. This is performed over the range of relevant frequencies, referred to as a sweep, until the transfer function for the engine mount at various frequencies is established over the range of interest. These transfer functions are then stored and used to program output equalizer 916. Although the transfer functions are established using a sweep for the purposes of this application, it should be noted that several techniques are known for establishing the transfer functions of the engine mount. Equalizer 916 is programmed to compensate for the transfer function of the electromechanical engine mount system. A properly programmed equalizer 916 causes the mechanical engine mount system to respond relatively constantly across a broad range of frequencies so the signals generated by the vibration control system do not cause the engine mount system to oscillate over the relevant range. Thus, equalizer 916 allows optimal cancellation without promoting system instability. Equalizer 916 may be located anywhere along the signal path between sensor 100 and actuator 120.

Output equalizer 916 provides signals to a power amplifier 918, which amplifies the signal generated by output filter 916 sufficiently to drive actuator 120. The gain of amplifier 918 suitably is constant, but can be dynamically adjusted in accordance with signals from controller 900B to maintain stability if desired. Adjustment of the gain-of amplifier 918 might be desirable if the gain of the individual bandpass filters cannot be varied. The output of power amplifier 918 is then transmitted, suitably through a switch 902, to actuator 120.

As shown in FIG. 10, digital control circuitry 900B suitably includes a synchronizing signal interface 922; a clock generator, suitably a clock generator 924 generating a number of signals at various frequencies according to received control signals; a human interface 925; a CPU 906 and a memory system 908; a multiplexer 909; an analog to digital converter (ADC) 910; a digital to analog converter (DAC) 912; and a bus 905. CPU 906 may be any suitable sort of microprocessor or controller device. By transmitting and receiving signals on bus 905, CPU 906 controls various system functions and monitors operations, including the gains of amplifiers 904 and 918, the quality gain, and center frequency of each bandpass filter 106-1 to 106-n, and the parameters of equalizer 916.

A human interface circuit 925, suitably may be connected to a panel of switches allowing the user various options, to initiate various modes of operation, to initiate a self-test cycle, or to enable or disable the vibration control system. For example, in certain circumstances, it may be desirable to switch between alternative modes of operation, e.g. continuously change the canceled frequencies throughout operation, or alternatively to select the canceled frequencies or frequency multiples when the system is first enabled and thereafter retain the selection throughout operation. By toggling the appropriate switch, the user may indicate the proper mode of frequency selection. Interface 925 may also include a series of LEDs or other indicators to provide information regarding current operational status.

The center frequency of each bandpass filter 106-1 to 106-n is dynamically controlled. Signals from rotation sensor 102 are provided to synchronizing signal interface 922, which suitably generates signals at the same frequency as rotation sensor 102 signal, but compatible with the digital electronics of control circuit 900B. The output of synchronizing interface 922 is connected to clock generator 924. Clock generator 924 generates several signals at various frequencies. Suitably, clock generator 924 may be a programmable clock generator which generates signals of various multiples of the engine speed according to control signals received from CPU 906. Alternatively, clock generator 924 may include a phase locked loop frequency multiplier which multiplies the frequency of signals received from sensor 102. One of the output signals generated by clock generator 924 related to a fundamental vibration frequency of the engine. For switched capacitor filters, this corresponding frequency is typically 50 to 100 times the desired filter center frequency, depending upon the type of filter employed. Other signals generated by clock generator 924 correspond to related frequencies (e.g., integer or non-integer multiples of the fundamental engine rotation frequency). Each bandpass filter's 106-1 to 106-n center frequency is varied according to the corresponding clock signal output of clock generator 924. Thus, the first engine rotation frequency bandpass filter 106-1 has a center frequency at the first significant engine vibration frequency. The remaining filters 106-2 to 106-n are similarly set to transmit signals at related (e.g., integer or non-integer multiples) frequencies. Clock generator 924 is connected to the bus 905 so that clock generator 924 may be sampled, programmed, or adjusted by CPU 906.

CPU 906 provides the appropriate control signals to clock generator 924, which in turn generates clock signals at the proper frequencies for application to bandpass filters 106-1 to 106-n at the frequency of the vibration to be canceled. Clock generator 924 need not be dependent upon the synchronizing signal generated by sensor 102. If desired, clock generator 924 may be receptive of a separate independent speed signal associated with a noise source independent of motor speed (e.g., an electric fan) and/or may include internal clock circuitry (e.g., a crystal oscillator) that generates signals over a wide range of frequencies according to predetermined values or signals generated by the microprocessor. The internal clock is especially useful for generating test signals over a wide range of frequencies for testing the circuitry and determining the transfer function of the mechanical engine mount. With an internal clock, wideband cancellation of vibrations may be performed, including frequencies unrelated to the engine speed indicated by sensor 102. Consequently, any periodic vibration sensed by sensor 100 and determined to be significant by CPU 906 may be canceled.

ADC 910 includes an input connected to multiplexer 909, which has inputs connected to bandpass filters 106-1 to 106-n, power amplifier 918, and accelerometer 100. Multiplexer 909 is controlled by CPU 906. ADC 910 converts signals from analog signals to digital signals for CPU 906, and is controlled by CPU 906 over bus 905.

DAC 912 also receives control signals on bus 905, and converts the digital signals into corresponding analog signals. The output of DAC 912 is selectively connected to the input of programmable gain amplifier 904 or to the input of actuator 120 to facilitate testing, as will be described. CPU 906 can disconnect power amplifier 918 from actuator 120 by opening switch 902 and disconnect accelerometer 100 from programmable gain amplifier 904 by opening switch 900 to perform system tests through ADC 910 and DAC 912.

Figure 11A:
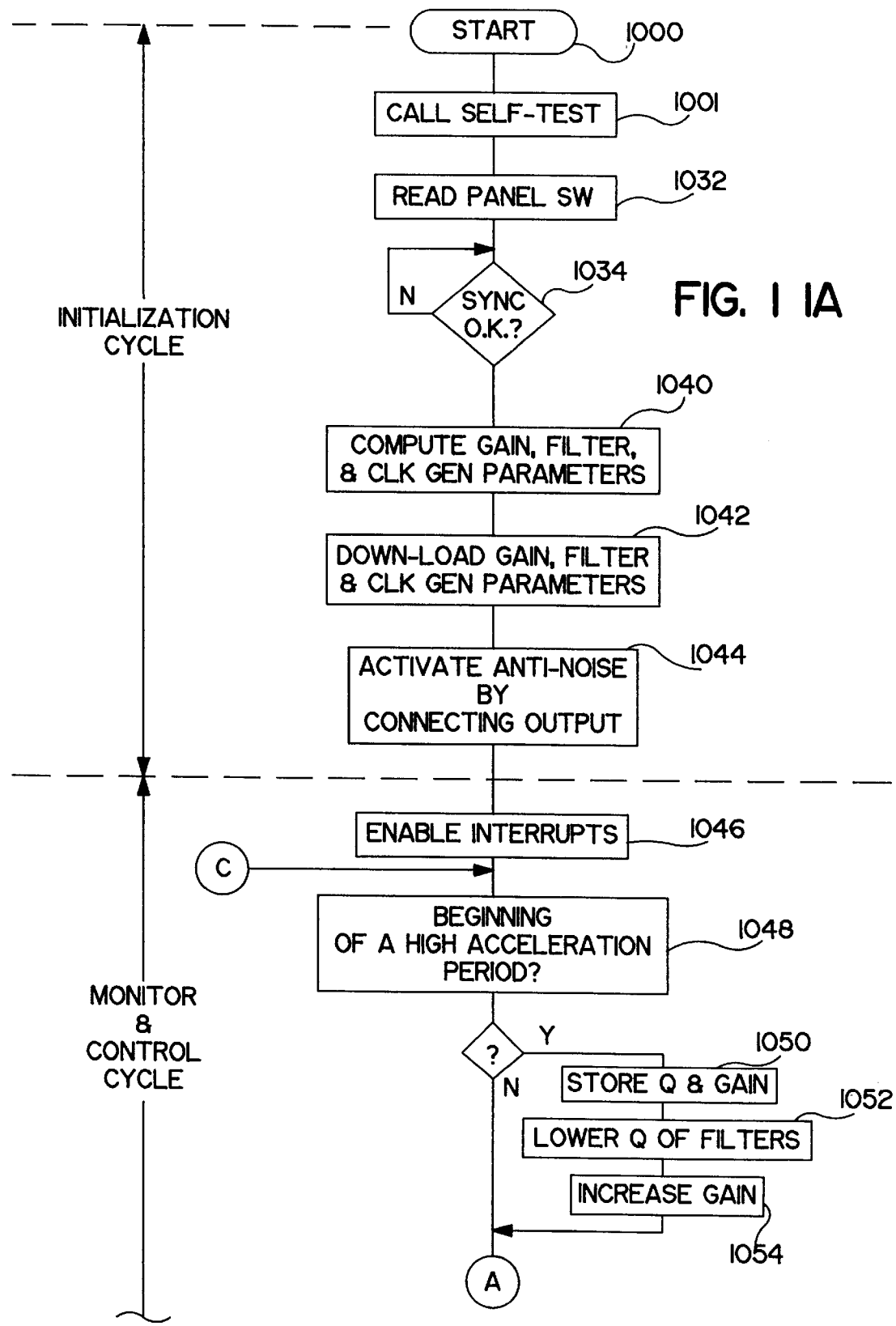
FIGS. 11A–11D are flow diagrams for CPU operations for the control circuit CPU.
Figure 11B:
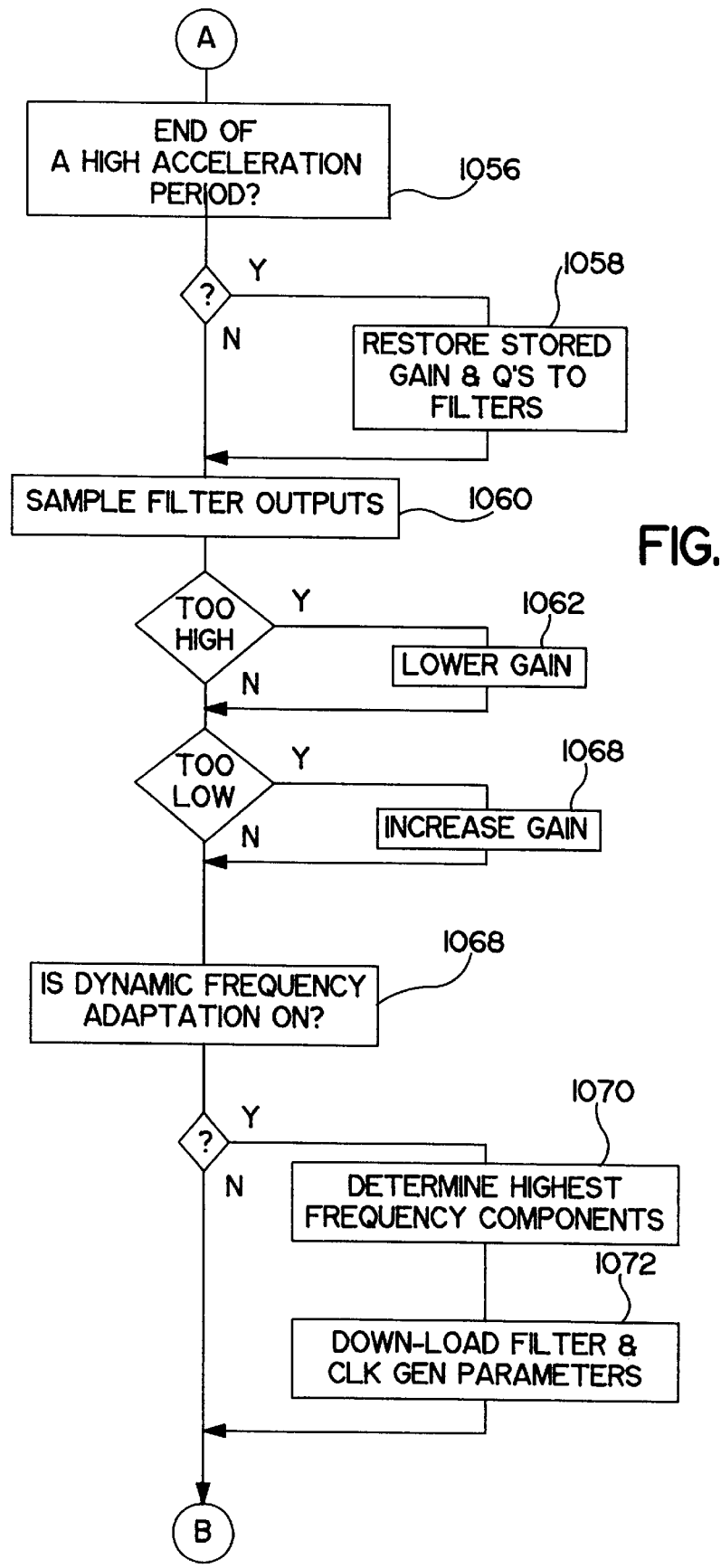
Figure 11C:
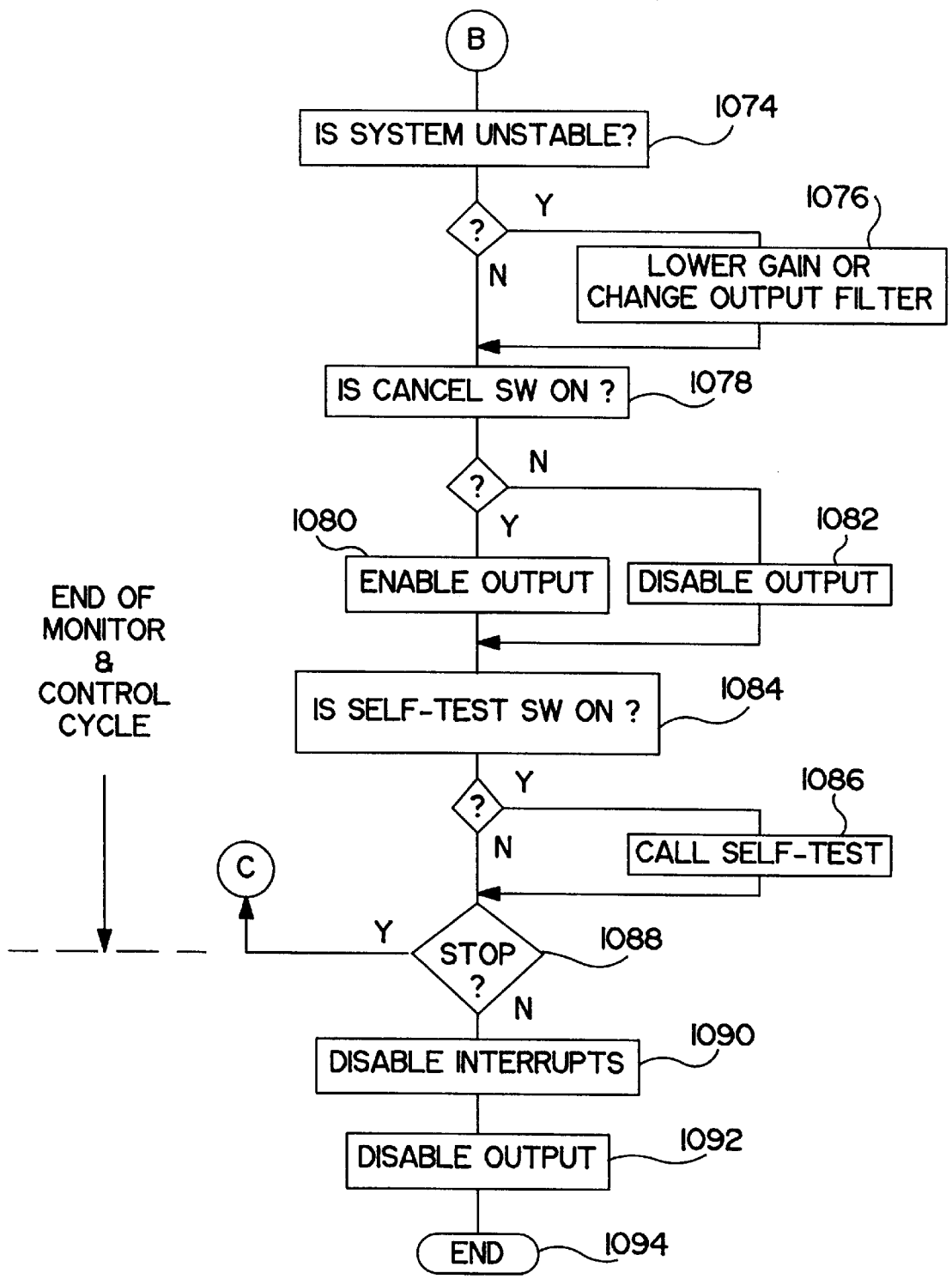
Figure 11D:
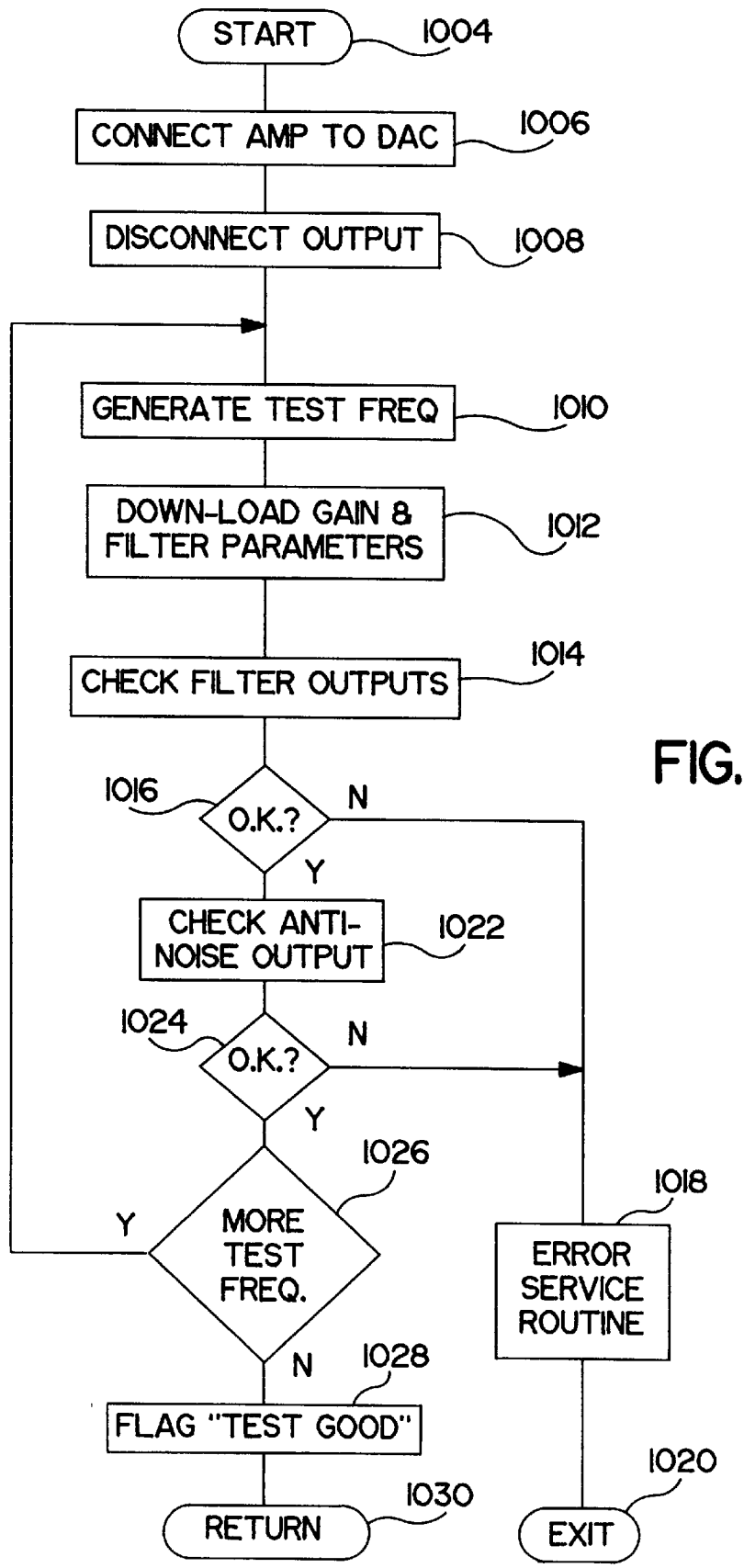

Referring now to FIGS. 11A through 11D, CPU 906 preferably performs the following sequence of operations. When the system is powered up, an initialization sequence is initiated (step 1000). Self-test subroutine is then executed (step 1002). As shown in FIG. 11D, in effecting the self-test routine, sensor (e.g., accelerometer) 100 is initially disconnected from and the output of DAC 912 connected to the input of programmable gain amplifier 904 by switch 900 (step 1006). The output of power amplifier 918 is disconnected from actuator 120 using switch 902 (step 1008). CPU 906 then generates a test signal at a particular frequency (step 1010), which is provided over bus 905 to the DAC converter 912.

DAC 912 converts the test signal into analog form and provides the test signal to analog circuit 900A. Power amplifier's 918 response to the test signal is received by ADC 910. Initial gain and filter parameters are retrieved from memory 908 and provided to the proper components (step 1012). CPU 906 then samples the output of one of bandpass filters 106-1 to 106-n through analog-to-digital converter 910 (step 1014) and determines whether the sampled filter output is accurate for a designated operating bandpass filter (step 1016).

If not, an error service routine is executed (step 1018) to alert the operator of a malfunction in the system. No further operations are performed (step 1020).

If the sampled bandpass filter is operating properly, the output of power amplifier 918 is sampled by CPU 906 through the ADC converter 910 (step 1022) and tested (step 1024). If power amplifier 918 is not properly operating, the error service routine is executed (step 1018). If power amplifier 918 is properly operating, a determination is made as to whether any of the bandpass filters 106-1 to 106-n remain untested (step 1026), and if so, the next bandpass filter- and power amplifier 918 are again tested at a new frequency (step 1010). If each of bandpass filters 106-1 to 106-n has been tested and has passed, a flag is set, indicating that the system has passed the self-test (step 1028), and a return to the main program effected (step 1030).

After the execution of the self-test routine, CPU determines the status of the human interface for selected options (step 1032).

If various options are selected, appropriate subroutines may be called to execute the desired functions. CPU 906 then closes switch 900 to reconnect accelerometer 100 to programmable gain amplifier 904 and tests the signal provided by rotation sensor 102 (step 1034). If a signal is not yet being received from rotation sensor 102, CPU 906 continues to test rotation sensor 102 signal until a signal is asserted. Next, the main program directs CPU 906 to compute the parameters for amplifier 904, filter 106-1 to 106-n, and rotation sensor 102 parameters (step 1040). The computed parameters are then downloaded to the proper components (step 1042). Next, CPU 906 closes switch 902 and reconnects the output of power amplifier 918 to actuator 120, thus enabling the vibration control system.

To begin monitoring and controlling the system, all interrupts for CPU 906 are enabled (step 1046). CPU 906 then samples rotation sensor 102 signal to determine whether a high acceleration period has been initiated (step 1048). During high acceleration periods, the engine races, so that the fundamental engine rotation frequency and its related frequencies chance rapidly and the amplitude of the engine vibrations increase. If so, CPU 906 stores the current gain and quality of each of the amplifiers and filters in memory 908 (step 1050). CPU 906 then reduces the quality of each of filters 106-1 to 106-n by a predetermined amount (step 1052). Alternatively, filter quality may be adjusted by an amount calculated to correspond to the acceleration rate of the engine. CPU 906 may also increase the gain of power amplifier 918 to provide sufficient anti-noise in response to the high acceleration (step 1054). However, the increase of gain remains subject to the instability criteria described above. It the relevant filtered frequency is too high, a significant increase in gain may promote instability.

If a hitch acceleration period is not starting, or if the filter and amplifier characteristics have already been properly altered, CPU 906 samples rotation sensor 102 signal to determine whether the system is at the end of a high acceleration period (step 1056). If so, CPU 906 retrieves the stored gain and quality parameters from memory 908 and restores them to the respective components (step 1058). I engine is not at the end of a high acceleration period, or if the gain and quality parameters have already been restored to the components, the outputs of bandpass filters 106-1 to 106-n are sampled (step 1060). If the filter output amplitudes exceed a predetermined threshold, the gain of programmable gain amplifier 904 is reduced by CPU 906 to maintain acceptable output levels (step 1062). The output of filters 106-1 to 106-n is then compared to a second threshold (step 1064). If the filter output amplitude is below the second threshold, the gain of programmable gain amplifier 904 is increased to achieve sufficient amplification (step 1066). Alterations of the gain of amplifier 904 are balanced by an inversely proportional alteration of power amplifier's 918 gain as may be necessary to maintain system stability.

CPU 906 next determines whether the dynamic frequency adaptation feature has been enabled (step 1068). The dynamic frequency adaptation feature determines which relevant frequencies have the greatest magnitude and programs the center frequencies of bandpass filters 106-1 to 106-n for those frequencies. If it is enabled, the signal received from accelerometer 100 is tested to determine which frequencies have the greatest magnitude and thus cause the greatest vibration (step 1070). Parameters are provided to clock generator 924 by CPU 906 to generate the proper clock signals (step 10-72). Clock generator 924 then changes the frequency of its output signals so that bandpass filters 106-1 to 106-n have center frequencies corresponding to the most significant frequencies.

After establishing is the proper center frequencies, CPU 906 tests the output of power amplifier 918 to determine whether the output of the analog circuit is unstable (step 1070). If so, CPU 906 adjust the quality and gain of the highest frequency bandpass filter 106-n to maintain system stability (step 1076) CPU 906 then reads human interface 925 to determine whether the cancellation system is enabled (step 10-073). If so, CPU 906 closes switch 902 to connect the output of power amplifier 918 to actuator 120 (step 1080). If cancel feature is not enabled, CPU 906 opens switch 902 and actuator 120 is disconnected from the output of power amplifier 918 (step 1082). Next, CPU 906 checks human interface 925 to determine whether a self-test of the system is desired above (step 1084). if so, CPU 906 calls self-test routine, described above (step 1084). CPU 906 then returns to the main program and checks human interface 925 to determine whether to terminate the program (step 1088). If not, CPU 906 returns to the start of the monitor cycle (step 1048) and the system continues to monitor the control circuit functions. If so, the CPU 906 interrupts are disabled (step 1090). CPU 906 then opens switch 902 to disconnect the output of power amplifier 918 from actuator 120 (step 1092). Execution of the program is then complete (step 1094).

The control system of the preferred embodiment allows the vibration control system to operate more effectively. In prior art digital systems, the noise detected by accelerometer 100 is phase shifted due to the processing delay between generation of the vibration by engine 101 and production of control signals by the control circuit. Consequently, the system becomes prone to instability and the performance of the vibration control system declines. In contrast, the analog circuit of the preferred embodiment minimizes the response delay. In addition, the digital circuitry combined with the analog circuit provide some intelligence and allow the system performance to be monitored and optimized.

While the present invention has been described with reference to an engine vibration control system, it is not limited thereto and is applicable to many situations in which it is desirable to cancel wave-based signal. wave-based signals include longitudinal transverse waves in solids, liquids or gases, vibrations and flexure. Furthermore, the present invention will find application in many different situations, for instance, to quiet a refrigerator, in an active exhaust muffler or to cancel fan noise in ducting.

In the embodiments described above, the system is used to isolate engine vibrations from a vehicle body. If, however, accelerometer 100 were affixed to the engine, the system would operate to cancel the vibrations in the engine itself. Therefore, it will be appreciated that the present system can be employed for both isolating and directly canceling unwanted periodic acoustic signals.

The foregoing description of the preferred embodiment is for illustrative purposes only and should not be construed to limit the invention to the embodiment described above. It would be apparent to one of ordinary skill that several changes in the components, materials, arrangement, and design of the above system may be varied without departing from the spirit of the invention.

We claim:

1. An active feedback noise cancellation system, comprising:

a sensor for detecting a residual vibration having a periodic component, said residual vibration comprising the sum of an unwanted vibration to be canceled and a canceling vibration which operates to cancel the unwanted vibration, and generating a residual signal according to said detected residual vibration;

a control circuit connected to said sensor for receiving said residual signal from said sensor, wherein said control circuit includes a plurality of narrow bandpass filters connected in parallel that filter said residual signal to produce an electrical canceling signal, wherein each narrow bandpass filter of the plurality of narrow bandpass filters has an adjustable center frequency responsive to the frequency of said periodic component and adjusted to maintain within its passband a frequency related to said periodic component of said residual signal in order to achieve stability of said active feedback noise cancellation system over a wide range of harmonic frequency components;

an actuator connected to said control circuit for receiving said filtered electrical canceling signal and generating the canceling vibration according to said filtered residual signal; and a means for testing said noise cancellation system connected to said sensor; wherein each said filter is tuned to the frequency of said periodic component so that said periodic component of said residual signal is transmitted to said actuator.

2. An active noise cancellation system according to claim 1, wherein each said filter is a tunable bandpass filter, and wherein said filter is tuned so as to maintain within its passband a selected frequency related to said periodic component of said residual signal.

3. An active noise cancellation system according to claim 1, wherein a first narrow bandpass filter of said plurality of narrow bandpass filters is tuned to a different frequency than a second narrow bandpass filter of said plurality of narrow bandpass filters.

4. An active noise cancellation system according to claim 3, including means for dynamically varying the −3 dB frequency of said second narrow bandpass filter as a function of a preselected frequency of said periodic component of said residual signal.

5. An active noise cancellation system according to claim 1, further comprising means connected to said plurality of narrow bandpass filters for dynamically determining the frequency of said periodic component of said residual signal and dynamically tuning said plurality of narrow bandpass filters according to said dynamically determined frequency.

6. An active noise cancellation system according to claim 1, wherein said center frequencies of said plurality of narrow bandpass filters are tuned to integer multiples of the frequency of said periodic component.

7. An active noise cancellation system according to claim 1, wherein said control circuit includes means for dynamically varying the operating parameters of said plurality of narrow bandpass filters to maintain stable operations of said system over a predetermined range of frequencies.

8. An active noise cancellation system according to claim 7, wherein said operating parameter varying means includes a microprocessor connected to said residual vibration sensor and said plurality of narrow bandpass filters for receiving said residual signal, calculating a current transfer function of said system, and adjusting said filtered residual signal according to said calculated current transfer function.

9. An active noise cancellation system according to claim 8, wherein said operating parameter varying means further comprises an equalizer connected in series with said plurality of narrow bandpass filters, said sensor, and said actuator for adjusting said signal, wherein said microprocessor is connected to said equalizer for receiving said residual signal, calculating a current transfer function of said system based on said equalizer processed residual signal and said residual signal sensed by said sensor, and adjusting said equalizer according to said calculated current transfer function.

10. An active noise cancellation system according to claim 7, wherein said operating parameter varying means includes a microprocessor connected to said plurality of narrow bandpass filters and said sensor, wherein said microprocessor receives said residual signal from said sensor, processes said residual signal, and adjusts the portion of said residual signal transmitted by said plurality of narrow bandpass filters according to said processed residual signal.

11. An active noise cancellation system according to claim 10, wherein said microprocessor selects a predetermined number of frequency components of said residual signal based at least partially on the amplitudes of said frequency components, and adjusts said residual signal transmitted by said plurality of narrow bandpass filters according to said selected frequency components.

12. An active noise cancellation system according to claim 11, wherein at least one of said selected frequency components is a constant frequency component of said residual signal.

13. An active noise cancellation system according to claim 7, wherein said operating parameter varying means includes means for adjusting the gain of said noise cancellation system.

14. An active noise cancellation system according to claim 7, wherein said operating parameter varying means includes means for adjusting the quality factor Q of said plurality of narrow bandpass filters.

15. An active noise cancellation system according to claim 7, wherein:

said residual vibration includes a periodic component; and
said each narrow bandpass filter of said plurality of narrow bandpass filters is tuned to the frequency of said periodic component so that said periodic component of said residual signal is transmitted to said actuator.

16. An active noise cancellation system according to claim 15, wherein said operating parameter varying means includes a microprocessor connected to said residual wave sensor and said plurality of narrow bandpass filters for receiving said residual signal, calculating transfer function of said system, and adjusting said filtered residual signal according to said calculated current transfer function.

17. An active noise cancellation system according to claim 16, wherein said operating parameter varying means further comprises an equalizer connected in series with said plurality of narrow bandpass filters, said sensor, and said actuator for adjusting said signal, wherein said microprocessor is connected to said equalizer for receiving said residual signal, calculating a current transfer function of said system based on said equalizer processed residual signal and said residual signal sensed by said sensor, and adjusting said equalizer according to said calculated current transfer function.

18. An active noise cancellation system according to claim 15, wherein said operating parameter varying means includes a microprocessor connected to said filter and said sensor, wherein said microprocessor receives said residual signal from said sensor, processes said residual signal, and adjusts the portion of said residual signal transmitted by said plurality of narrow bandpass filters according to said processed residual signal.

19. An active noise cancellation system according to claim 18, wherein said microprocessor selects a predetermined number of frequency components of said residual signal based at least partially on the amplitudes of said frequency components, and adjusts the portion of said residual signal transmitted by said plurality of narrow bandpass filters according to said selected frequency components.

20. An active noise cancellation system according to claim 19, wherein at least one of said selected frequency components is a constant frequency component of said residual signal.

21. An active noise cancellation system according to claim 15, wherein said operating parameter varying means includes means for adjusting the gain of said noise cancellation system.

22. An active noise cancellation system according to claim 15, wherein said operating parameter varying means includes means for adjusting the quality factor Q of said filter.

23. An active noise cancellation system according to claim 1, wherein said testing means comprises a microprocessor for providing a test signal over a range of frequencies to said actuator, receiving said residual signal in response to said test signal provided to said actuator, and analyzing amplitude and phase components of said residual signal to determine the operational status of said cancellation system.

24. An active noise cancellation system according to claim 23, wherein said testing means comprises:

- a test signal generator connected to said actuator for providing said test signal to said actuator;
- a receiver for receiving said residual signal from said sensor in response to said test signal; and
- a testing circuit for testing said amplitude and phase components of said received residual signal.

25. The system of claim 1, wherein said plurality of narrow bandpass filters is a plurality of switched capacitor bandpass filters and each narrow bandpass filter of said plurality of narrow bandpass filters is a switched capacitor bandpass filter.

26. An active noise cancellation system according to claim 25, wherein said control circuit includes an anti-aliasing filter connected in series with said plurality of switched capacitor bandpass filters and a compensating filter connected in series with said plurality of switched capacitor bandpass filters for adjusting said plurality of switched capacitor bandpass filters to correct the effects of said anti-aliasing filter, wherein the compensating filter has a phase characteristic that is complementary to a phase characteristic of the anti-aliasing filter and reduces delay in the active noise cancellation system.

* * * * *